(12) United States Patent
Paris et al.

(10) Patent No.: US 10,223,819 B2
(45) Date of Patent: Mar. 5, 2019

(54) BROWSING AND DISPLAY WEATHER DATA

(71) Applicant: Vaisala Oyj, Helsinki (FI)

(72) Inventors: Douglas Paris, Fiskdale, MA (US); Teppo Rouvi, Sipoo (FI); Antti Sulanto, Espoo (FI); Hannu-Pekka Valo, Vantaa (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 15/642,319

(22) Filed: Jul. 5, 2017

(65) Prior Publication Data
US 2019/0012817 A1   Jan. 10, 2019

(51) Int. Cl.
G06T 11/20 (2006.01)
G06T 11/00 (2006.01)
G06T 11/60 (2006.01)
G06Q 10/10 (2012.01)
G06F 3/048 (2013.01)
G06F 17/30 (2006.01)
G06F 3/0482 (2013.01)

(52) U.S. Cl.
CPC .......... G06T 11/206 (2013.01); G06T 11/001 (2013.01); G06T 11/60 (2013.01); G06F 3/0482 (2013.01); G06F 17/30268 (2013.01)

(58) Field of Classification Search
CPC combination set(s) only.
See application file for complete search history.

(56) References Cited

U.S. PATENT DOCUMENTS

| 2004/0162675 A1* | 8/2004 | Moon | G06F 17/30873 702/3 |
| 2012/0150446 A1* | 6/2012 | Chang | G06Q 10/10 702/3 |
| 2014/0047344 A1* | 2/2014 | Watts | G01W 1/00 715/737 |
| 2016/0253632 A1* | 9/2016 | Won | G06F 3/048 715/771 |
| 2018/0107681 A1* | 4/2018 | Rainey | G06Q 10/06313 |

* cited by examiner

*Primary Examiner* — Wesner Sajous
(74) *Attorney, Agent, or Firm* — Maschoff Brennan; Paul G. Johnson

(57) ABSTRACT

A method for visualizing weather data via a GUI accessible via a computer display is provided. The GUI provides a map view for displaying a weather map image and an interactive time selection view for displaying a time selection image. The method comprises composing the time selection image that depicts an arrangement of symbols jointly representing a current time period, each symbol representing a respective sub-period of time within the current time period and having an appearance that is descriptive of at least one precipitation characteristic in one or more precipitation data records that include weather data for the respective sub-period of time; receiving an indication of a user-selected time instant; and composing the weather map image by overlaying a weather image on a map image, wherein the weather image is derived on basis of a precipitation data record that includes weather data for the user-selected time instant.

17 Claims, 5 Drawing Sheets

300

Visualize weather data provided as a time series of precipitation data records via a GUI that provides a map view for displaying a weather map image for a user-selectable time instant and an interactive time selection view for displaying a time selection image for user selection of said time instant.
302

Compose a time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time
304

Receive, via the GUI, an indication of user-selected time instant from the current time period displayed in the interactive time-selection view
306

Compose the weather map image by overlaying a weather image on a map image, wherein the weather image is derived on basis of a precipitation data record that includes weather data for the user-selected time instant
308

Figure 6

BROWSING AND DISPLAY WEATHER DATA

TECHNICAL FIELD

The example and non-limiting embodiments of the present invention relate to browsing and displaying meteorological data, such as measured or modeled precipitation data.

BACKGROUND

Visualization of meteorological data provides a useful tool for searching and analyzing weather conditions over a time period of interest. Typical approach for weather data visualization involves displaying an image of a map that represents a geographical area of interest and overlaying another image that indicates spatial coverage of precipitation together with precipitation intensity during a time period of interest on the map image.

Weather data visualization tools that are currently available typically enable displaying weather data for a pre-defined geographical area and selecting a rather coarse selection of a time period of interest. Examples of known approaches for selecting the time period of interest include selecting a weather data record of interest from a list of items presented to a user via a user interface (e.g. as a file listing) possibly together with metadata such as item size and/or time stamp associated with each listed item.

Since there is typically a vast amount of weather data available for selection, the known solutions for selecting the time period of interest may be a cumbersome and time-consuming process that often results in excess usage of computational resources, especially when browsing through time periods in an attempt to find a specific weather event or a weather event of specific characteristics.

While efficient access to such weather data is typically important for meteorological research, convenient access to such weather data likely makes it more readily applicable also in other fields of technology and business and also more readily accessible by general public.

SUMMARY

Therefore, it is an object for at least some embodiments of the present invention to provide a technique that enables browsing through history of weather data for visualization to a user in a convenient and computationally efficient manner.

According to an example embodiment, a method for visualizing weather data stored as a time series of precipitation data records via a graphical user interface (GUI) that is accessible via a display of a computer is provided, wherein the GUI provides a map view for displaying a weather map image for a user-selectable time instant and an interactive time selection view for displaying a time selection image for user selection of said time instant, the method comprising composing the time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time; receiving, via the GUI, an indication of user-selected time instant from the current time period displayed in the interactive time-selection view; and composing the weather map image by overlaying a weather image on a map image, wherein the weather image is derived on basis of a precipitation data record that includes weather data for the user-selected time instant.

According to another example embodiment, an apparatus for visualizing weather data stored as a time series of precipitation data records is provided, the apparatus comprising at least one processor and at least one memory including computer program code, which when executed by the at least one processor causes the apparatus to visualize the weather data via a GUI that provides a map view for displaying a weather map image for a user-selectable time instant and an interactive time selection view for displaying a time selection image for user selection of said time instant, the apparatus further caused to compose the time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time; receive, via the GUI, an indication of user-selected time instant from the current time period displayed in the interactive time selection view; and compose the weather map image by overlaying a weather image on a map image, wherein the weather image is derived on basis of a precipitation data record that includes weather data for the user-selected time instant.

According to another example embodiment, a computer program is provided, the computer program comprising computer readable program code configured to cause performing at least the method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where

FIG. 6 illustrates a method according to an example; and

DESCRIPTION OF SOME EMBODIMENTS

A weather data visualization system that serves as a framework for various embodiments of the present invention serves to enable displaying a map image that represents a geographical area of interest with a precipitation image that depicts at least one characteristic of precipitation within said geographical area overlaid thereon. The precipitation image typically represents a time instant of interest and depicts spatial coverage of precipitation together with precipitation intensity. In this regard, the spatial coverage of precipitation may be indicated in precipitation image such that image portions of the precipitation image spatially corresponding to map image locations for which no precipitation is to be depicted are transparent, whereas image portions of the precipitation image spatially corresponding to map image locations for which precipitation is to be depicted are shown as non-transparent with a color of the non-transparent portion of the precipitation image serving as an indication of precipitation intensity in the respective map image location. The color applied for a given pixel (or a given group of pixels) in a non-transparent portion of the precipitation image is determined according to predefined mapping between precipitation intensity and color. Such visualization of the precipitation information as such is well known in the art.

Figure 1:
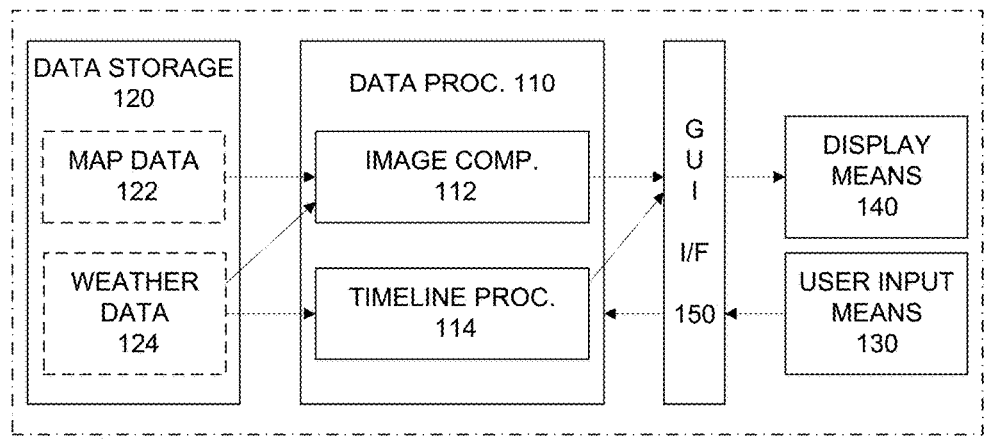
FIG. 1 illustrates a block diagram of some components and/or entities of a weather data visualization system according to an example.

FIG. 1 illustrates a block diagram of some logical components of a weather data visualization system 100 according to an example. The weather data visualization is based on map data 122 and weather data 124 stored in a data storage means 120. The data storage means may comprise one or more storage devices, such as one or more memories and/or one or more mass storage devices. Without losing generality, we may assume that the stored data includes map data 122 for a predefined geographical area together with weather data 124 that includes a time series of precipitation data records that each store information that is descriptive of at least one precipitation characteristic at respective time instant, e.g. indication(s) of observed intensity of precipitation in a plurality of locations within the geographical area at the respective time instant. In this regard, the precipitation data records may be provided for time instants that cover a time period of interest at a suitable granularity (e.g. 'sampling rate'), e.g. such that temporal distance between time instants represented by two consecutive precipitation data records of the series is a suitable value chosen from a range from a few minutes to several hours, e.g. 10 minutes.

The map data 122 may be stored as an image that is directly useable as the map image, or as information that may be employed to derive the map image. In the weather data 124, a precipitation data record includes a plurality of precipitation indications for respective plurality of predefined locations within the geographical area represented by the map data 122 for a respective time instant. According to an example, the precipitation indications originate from one or more weather radars or they may be derived on basis of information obtained from one or more weather radars. In this example, each precipitation indication serves to indicate observed precipitation intensity in the respective predefined location within the geographical area represented by the map data 122. In another example, the precipitation indications originate from a weather model or weather simulation that, whereas the content of such precipitation data records may be similar that described for the weather radar example.

A precipitation data record may further include metadata that further characterizes the precipitation data record and/or its relationship with the map data 122. As an example, the metadata may include a timestamp that indicates the time instant represented by the precipitation data record and/or position information that defines the geographical location(s) represented by the precipitation data record. The metadata in a given precipitation record may further include one or more pre-computed precipitation values that serve to indicate a respective characteristic of precipitation indications of the given precipitation data record. Examples of such pre-computed precipitation values include an indication of spatial coverage of precipitation, an indication of average precipitation intensity within the geographical area represented by the map data 122 and an indication of accumulated precipitation over the geographical area represented by the map data 122.

The one or more pre-computed precipitation values that may be stored in the metadata of a precipitation data record are typically computed on basis of the precipitation indications of said precipitation data record. In another example, the pre-computed precipitation values that may be stored in the metadata of a precipitation data record and the precipitation indications of the precipitation data record may originate from different sources: as an example, the precipitation values may be computed on basis of precipitation indications that originate from a weather model or weather simulation, while the actual precipitation indications stored in the precipitation data record may originate from one or more weather radars. More detailed examples regarding applicable precipitation values and their use for facilitating access to the precipitation data record of interest are provided later in this text.

The precipitation indications in a precipitation data record may be provided, for example, as a two-dimensional array of values where each element of the array corresponds to a respective predefined spatial position within the map image (and hence to a corresponding geographical location) while the value of the array element indicates intensity of precipitation in a geographical location represented by said spatial position of the map image. As an example, an array element may be provided as a numerical value in a range from 0 to a predefined maximum value, where 0 indicates that no precipitation has been observed for the corresponding geographical location and where a value larger than zero indicates the relative intensity of the precipitation observed for the corresponding geographical location. In an example, a precipitation record may be provided as a precipitation image, where each pixel position corresponds to a respective spatial position within the map image and where each pixel value represents observed precipitation intensity in a geographical location represented by said spatial position of the map image.

In an example, the data storage means 120 is arranged to store the precipitation data records in a single storage device. In another example, the information included in the precipitation data records may be distributed e.g. over two separate memory devices such that a first memory device stores the metadata or at least part thereof whereas a second memory device stores the precipitation indications (together with parts of the metadata not stored in the first memory device). In such an arrangement the first memory device may have a smaller storage capacity while it may allow fast access to the data stored therein, whereas the second memory device may provide a higher storage capacity with a slower access to the data stored therein, the first memory device thereby serving as a cache.

Figure 2:
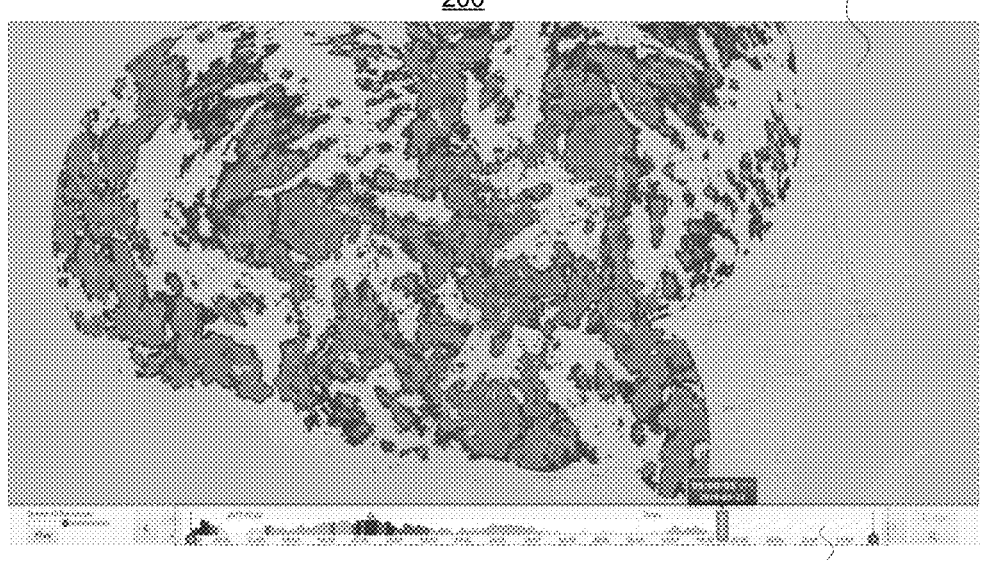
FIG. 2 schematically illustrates a graphical user interface (GUI) for operating at least some aspects of a weather data visualization system according to an example.

The weather data visualization system 100 provides access to the weather data 124 via a graphical user interface (GUI). In this regard, FIG. 2 schematically illustrates a GUI 200 according to an example. The GUI 200 provides a map view 202 for displaying the weather data for a (user-) selected time instant and an interactive time selection view 204 for selecting the time instant for which the weather data 124 is to be displayed in the map view 202. The interactive time selection view 204 further enables browsing through the time instants available via the weather data visualization system 100, as will be described via detailed examples in the following. The GUI 200 may include one or more further elements that relate to configuration and usage of the weather data visualization system 100 but that bear no or only an indirect relevance to various embodiments of the present invention.

A GUI interface (I/F) 150, representing at least some functions of the GUI 200, serves to convert user input received via user input means 130 into commands or instructions that control operation of the weather data processing entity 110, e.g. control a weather map image composition entity 112 to create a weather map image for rendering in the map view 202 and control a timeline processing entity 114 to create a time selection image for rendering in the interactive time selection view 204 of the GUI 200 accordingly. The GUI IF 150 further serves to arrange the weather map image data composed by the weather map image composition entity 112 and the time selection image composed by the timeline processing entity 114 for presentation in the map view 202 and in the interactive time selection view 204 of the GUI 200, respectively. The GUI is displayed to a user via display means 140.

Along the lines described in the foregoing, the weather image composition entity 112 operates to compose the weather map image by creating a map image on basis of the map data 122, by creating a precipitation image on basis of the weather data 124 and by overlaying the precipitation image on the map image to create the weather map image. The weather data record that is used as basis of the precipitation image is obtained from the weather data 124 in accordance with user input that indicates the time instant of interest. Selection of the time instant of interest is carried out by the user operating the user input means 130 to select the time instant of interest via the interactive time selection view 204 of the GUI 200. This aspect of the weather data visualization system 100 is described in the following.

Along the lines described in the foregoing, the timeline processing entity 114 operates to compose a time selection image that is displayed in the interactive time selection view 204 in the GUI 200. The time selection image depicts an arrangement of symbols that jointly represent a current time period from a current starting time to a current ending time. Herein, the current time period represents those time instants that are currently available for selection by a user via the interactive time selection view 204. Each symbol of the arrangement represents a respective sub-period of time between the current starting time and the current ending time. Preferably, although not necessarily, each symbol of the arrangement represents a sub-period of equal duration. The sub-periods of time are non-overlapping while the typically fully cover the current time period from the current starting time to the current ending time. A sub-period corresponds to one or more precipitation data records stored in the weather data 124, and the appearance of the symbol representing a certain time period is derived in dependence of the one or more precipitation data records such that the appearance of the symbol conveys information that is descriptive of at least one precipitation characteristic for the sub-period of time represented by the symbol.

In general, one or more aspects of appearance of a symbol in the arrangement of symbols depicted in the time selection image are descriptive of respective one or more characteristics of precipitation provided in one or more precipitation data records that serve to provide weather data for the respective sub-period of time. In an example, only one aspect of appearance of a symbol of the arrangement may serve as an indication of a predefined precipitation characteristic. As an example in this regard, a size of the symbol may be applied as an indication of the predefined precipitation characteristic. As another example in this regard, one of a color, a color intensity and pattern used for depicting the symbol may serve as the indication of the predefined precipitation characteristic. In another example, two aspects of appearance of a symbol of the arrangement may serve as respective indications of a first predefined precipitation characteristic and a second predefined precipitation characteristic. As an example in this regard, the size of the symbol may be applied as an indication of the first predefined precipitation characteristic and one of a color, a color intensity and pattern used for depicting the symbol may serve as the indication of the second predefined precipitation characteristic.

The predefined precipitation characteristic may include, for example, a spatial coverage of precipitation and/or a measure of intensity of precipitation. As examples in this regard, an indication of the spatial coverage may comprise an indication of an average or maximum spatial coverage of precipitation within the sub-period of time represented by the symbol, whereas an indication of a measure of intensity of precipitation may comprise an indication of average, maximum or accumulated precipitation within the sub-period of time represented by the symbol.

In an example, the time selection image may be provided as a timeline image that depicts a time series of symbols that jointly represent the current time period from the current starting time to the current ending time, as described above for the generic case of a time selection image. For editorial clarity and brevity of description, in the following a number of examples concerning various characteristics and usage of the time selection image are provided by using a timeline image as an illustrative and non-limiting example in this regard, while the description readily generalizes into arrangements of symbols that are different from arranging them into a timeline.

Figure 3A:
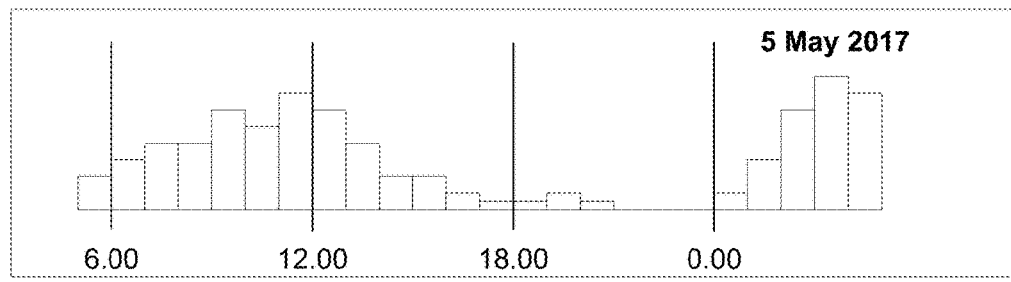
FIGS. 3A to 3C schematically illustrate a time selection image according to respective examples.
Figure 3B:
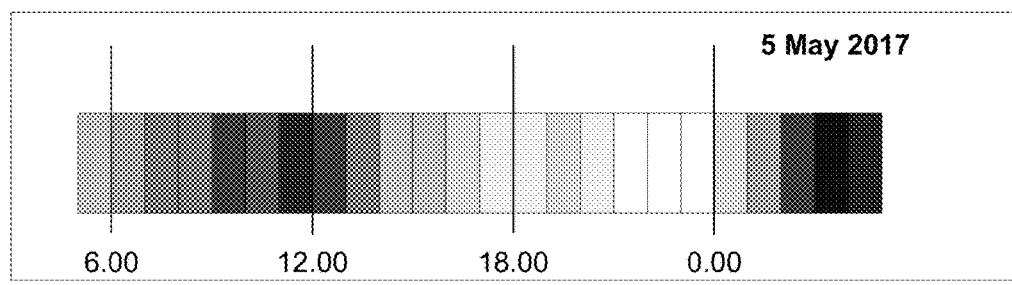
Figure 3C:
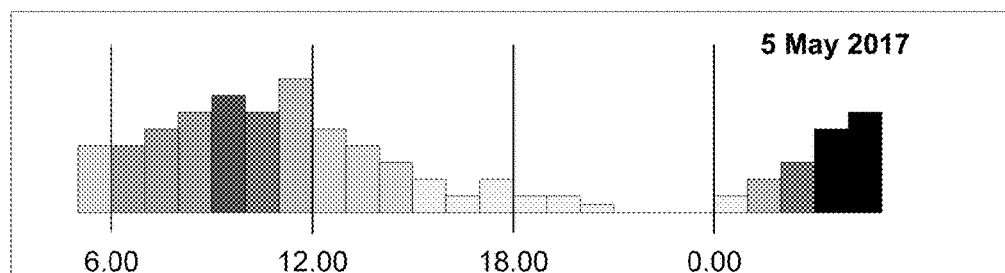

While the interactive time selection view 204 of the GUI 200 depicted in FIG. 2 provides a rather elaborate example of the timeline image according to an embodiment of the present invention, FIGS. 3A to 3C provide conceptual, non-limiting examples that facilitate understanding of this aspect of the present invention.

FIG. 3A depicts a timeline image where the timeline is represented by a series of 24 bars (e.g. rectangles) of equal width, each bar having a height that is descriptive of at least one precipitation characteristic for the sub-period of time period represented by the respective bar. For the sake of an illustrative and non-limiting example, these 24 bars may be considered to jointly represent a time period of one day, such that each bar represents a sub-period of one hour: in the example of FIG. 3A the first bar (in the left) represents a sub-period from 5 am to 6 am (on 4 May 2017), the second bar represents a sub-period from 6 am to 7 am, the third bar represents a sub-period from 8 am to 9 am and so forth, with the $24^{th}$ (i.e. the rightmost) bar in the timeline representing a sub-period from 4 am to 5 am (on 5 May 2017).

In the example of FIG. 3A, each bar serves to represent at least one characteristic of the weather data 124 pertaining to the sub-period of time represented by the respective bar in the timeline image displayed in the interactive time selection view 204. When composing the timeline image according to the example of FIG. 3A, for each bar in the timeline image the timeline processing entity 114 may identify precipitation data records that represent time instants that fall within the sub-period of time represented by the respective bar in the timeline image and determine the height of the respective bar on basis of precipitation indications of the identified precipitation data records. Assuming that precipitation indications are provided as an array of numerical values that each serve to indicate precipitation intensity in a respective spatial position of the map image shown in the map view 202 (as outlined in the foregoing), the height of a bar in the timeline may be derived as a function of array element values in the identified precipitation data records. As non-limiting illustrative examples in this regard, the height determination for a bar of the timeline may comprise one of the following approaches:

The height of a bar in the timeline may be derived on basis of a height reference computed as an average of respective precipitation values computed for the identified precipitation data records. As an example in this regard, a precipitation value for a given precipitation data record may be computed as the number of non-zero-valued array elements in the given precipitation data record, the height reference thereby indicating average spatial coverage of precipitation during the corresponding sub-period of time. In a variation of such computation of the height reference, the computation may consider array elements that have a value meeting a predefined criterion (e.g. a value that exceeds a predefined non-zero threshold).

The height of a bar in the timeline may be derived on basis of a height reference computed as a maximum of respective precipitation values computed for the identified precipitation data records. As an example in this regard, a precipitation value for a given precipitation data record may be computed as the number of non-zero-valued array elements in the given precipitation data record, the height reference thereby indicating the largest observed spatial coverage of precipitation during the corresponding sub-period of time. In a variation of such computation of the height reference, the computation may consider the number of array elements that have a value meeting a predefined criterion (e.g. a value that exceeds a predefined non-zero threshold).

The height of a bar in the timeline may be derived on basis of a height reference computed as an average of respective precipitation values computed for the identified precipitation data records. As an example in this regard, the precipitation value for a given precipitation data record may be computed as an average of all array elements in the given precipitation data record or as an average of non-zero-valued array elements in the given precipitation data record, the height reference thereby indicating average precipitation intensity across locations where precipitation has been observed during the corresponding sub-period of time. In another example in this regard, the precipitation value for a given precipitation data record may be computed as a sum of array elements in the given precipitation data record, the height reference thereby indicating average accumulated precipitation over the geographical area represented by the weather map image during the corresponding sub-period of time.

The height of a bar in the timeline may be derived on basis of a height reference computed as a maximum of respective precipitation values computed for the identified precipitation data records, whereas the respective precipitation values for the identified precipitation data records may be computed using one of the approaches described in the previous bullet point. Consequently, the height reference may serve to indicate, respectively, maximum short-term average precipitation intensity across locations where precipitation has been observed during the corresponding sub-period of time or maximum short-term accumulated precipitation over the geographical area represented by the weather map image during the corresponding sub-period of time.

As a generalization of the examples provided in the foregoing, the height reference for a bar in the timeline may be derived using a predefined function of precipitation values computed for the precipitation data records identified for the sub-period of time represented by said bar. Non-limiting examples of such functions include an integral or a derivative of precipitation values across the identified precipitation data records.

The height of a bar in the timeline may be derived on basis of a height reference computed as an average or median of all array elements (including also zero-valued ones) across precipitation data records identified for the respective bar, the height reference thereby jointly serving as an indication of both the spatial coverage and the precipitation intensity during the corresponding sub-period of time.

Still referring to examples pertaining to the illustration of FIG. 3A, the height reference computed e.g. according to any of the examples outlined in the foregoing is translated into the height of the bar according to a predefined mapping rule or function. As an example in this regard, the height reference may translate into the height of the corresponding bar such that a higher height reference maps into a higher bar and vice versa. In another example, a higher height reference may map into a lower bar and vice versa. In an example, the mapping rule or function provides a linear relationship between the height reference value and the resulting bar height. In other examples, the mapping rule or function may provide a non-linear relationship between the height reference value and the resulting bar height, e.g. a quadratic or exponential relationship such that higher height reference values are further emphasized. In various examples, a missing bar (or a bar having a zero height) for a certain sub-period of time may be applied to indicate that the weather data 124 does not include precipitation records for the certain sub-period of time and/or that the precipitation record(s) for the certain sub-period of time do not carry valid precipitation indications. In such examples, also the minimum value of the at least precipitation characteristic is indicated using a bar of non-zero height.

The example described with references to FIG. 3A may be varied in a number of ways within the framework of the GUI 200. As an example, instead of arranging the bars in the timeline image along a horizontal axis, the interactive time selection view 204 may be arranged on a side of the map view 202 and, consequently, the timeline image may be composed such that the bars of the timeline are arranged along vertical axis such that their height is equal or substantially equal with each bar having a width that is descriptive of at least one precipitation characteristic for the sub-period of time represented by the respective bar. In such an example, the bar widths may be derived e.g. by using one of the approaches described in the foregoing for deriving the bar heights.

In another exemplifying variation, the bars may be replaced with symbols of desired type, such that the symbol size serves as an indication of the at least one precipitation characteristic for the sub-period of time represented by the respective symbol, where the symbol sizes may be derived e.g. by using one of the approaches described in the foregoing for deriving the bar heights, mutatis mutandis.

FIG. 3B illustrates a variation of the example of FIG. 3A by depicting a timeline image where the timeline is represented by a series of 24 bars (e.g. rectangles) of equal width and height, with each bar illustrated in the timeline using the same color while exhibiting a color intensity that is descriptive of at least one precipitation characteristic for the sub-period of time represented by the respective bar. In the example of FIG. 3B grey is used as the color with the intensity of the grey color applied for a given bar serves as indication of the at least one precipitation characteristic for the sub-period of time corresponding to the given bar. In other examples, the bars may be depicted using a color different from grey with the intensity of a desired color serving as the indication of the at least one precipitation characteristic.

As in the case of FIG. 3A, also in the example of FIG. 3B each bar serves to represent at least one characteristic of the weather data 124 pertaining to the sub-period of time represented by the respective bar in the timeline image displayed in the interactive time selection view 204 and the precipitation data records used as basis for deriving the bar characteristic(s) may be identified in the same manner as described in the foregoing in context of the example of FIG. 3A.

Again assuming that precipitation indications are provided as an array of numerical values that each serve to indicate precipitation intensity in a respective spatial position of the map image shown in the map view 202 (as outlined in the foregoing), the color intensity for a bar in the timeline may be derived as a function of the number of non-zero-valued array elements in a precipitation data record over the precipitation data records identified for the respective bar or the color intensity for a bar in the timeline may be derived as a function of array element values in the identified precipitation data records. As non-limiting illustrative examples in this regard, the color intensity determination for a bar of the timeline may comprise one of the following approaches:

The color intensity for a bar in the timeline may be derived on basis of a color intensity reference computed as an average of respective precipitation values computed for the identified precipitation data records. As an example in this regard, a precipitation value for a given precipitation data record may be computed as the number of non-zero-valued array elements in the given precipitation data record, the color intensity reference thereby indicating average spatial coverage of precipitation during the corresponding sub-period of time. In a variation of such computation of the color intensity reference, the computation may consider array elements that have a value meeting a predefined criterion (e.g. a value that exceeds a predefined non-zero threshold).

The color intensity for a bar in the timeline may be derived on basis of a color intensity reference computed as a maximum of respective precipitation values computed for the identified precipitation data records. As an example in this regard, a precipitation value for a given precipitation data record may be computed as the number of non-zero-valued array elements in the given precipitation data record, the color intensity reference thereby indicating the largest observed spatial coverage of precipitation during the corresponding sub-period of time. In a variation of such computation of the color intensity reference, the computation may consider array elements that have a value meeting a predefined criterion (e.g. a value that exceeds a predefined non-zero threshold).

The color intensity for a bar in the timeline may be derived on basis of a color intensity reference computed as an average of respective precipitation values computed for the identified precipitation data records. As an example in this regard, the precipitation value for a given precipitation data record may be computed as an average of non-zero-valued array elements in the given precipitation data record, the color intensity reference thereby indicating average precipitation intensity across locations where precipitation has been observed during the corresponding sub-period of time. In another example in this regard, the precipitation value for a given precipitation data record may be computed as a sum of array elements in the given precipitation data record, the color intensity reference thereby indicating average accumulated precipitation over the geographical area represented by the weather map image during the corresponding sub-period of time.

The color intensity for a bar in the timeline may be derived on basis of a color intensity reference computed as a maximum of respective precipitation values computed for the identified precipitation data records, where the respective precipitation values for the identified precipitation data records may be computed using one of the approaches described in the previous bullet point. Consequently, the color intensity reference may serve to indicate, respectively, maximum short-term average precipitation intensity across locations where precipitation has been observed during the corresponding sub-period of time or maximum short-term accumulated precipitation over the geographical area represented by the weather map image during the corresponding sub-period of time.

As a generalization of the examples provided in the foregoing, the color intensity reference for a bar in the timeline may be derived using a predefined function of precipitation values computed for the precipitation data records identified for the sub-period of time represented by said bar. Non-limiting examples of such functions include an integral or a derivative of precipitation values across the identified precipitation data records.

The color intensity for a bar in the timeline may be derived on basis of a color intensity reference computed as an average or median of all array elements (including also zero-valued ones) across precipitation data records identified for the respective bar, the color intensity reference thereby jointly serving as an indication of both the spatial coverage and the precipitation intensity during the corresponding sub-period of time.

Still referring to examples pertaining to the illustration of FIG. 3B, the color intensity reference computed e.g. according to any of the examples outlined in the foregoing is translated into the color intensity according to a predefined mapping rule or function. As an example in this regard, the color intensity reference may translate into the color intensity of the corresponding bar such that a higher color intensity reference value maps into a higher color intensity of the bar and vice versa. In another example, a higher color intensity reference value may map into a lower color intensity of the bar and vice versa. In an example, the mapping rule or function provides a linear relationship between the color intensity reference value and the resulting color intensity. In other examples, the mapping rule or function may provide a non-linear relationship between the color intensity reference value and the resulting color intensity, e.g. a quadratic or exponential relationship such that higher color intensity reference values are further emphasized. In various examples, a missing bar or a certain predefined color intensity (e.g. the lowest or highest available color intensity) for a certain sub-period of time may be applied to indicate that the weather data 124 does not include precipitation records for the certain sub-period of time and/or that the precipitation record(s) for the certain sub-period of time do not carry valid precipitation indications.

The example described with references to FIG. 3B may be varied in a number of ways within the framework of the GUI 200. As an example, instead of arranging the bars in the timeline image along a horizontal axis, the interactive time selection view 204 may be arranged on a side of the map view 202. As another example, instead of using different intensities of the same color to indicate the at least one precipitation characteristic different predefined colors or patterns may be employed to indicate precipitation characteristic value falling within a respective predefined range of values.

FIG. 3C illustrates a further variation of the examples of FIGS. 3A and 3B by depicting a timeline image where the timeline is represented by a series of 24 bars (e.g. rectangles) of equal width, each bar having a height that is descriptive of a first precipitation characteristic for the sub-period of time period represented by the respective bar and each bar illustrated in the timeline using the same color while exhibiting a color intensity that is descriptive of a second precipitation characteristic for the sub-period of time represented by the respective bar. The exemplifying variations with respect to appearance of the symbols that constitute the timeline described in the foregoing for the examples depicted in FIGS. 3A and 3B apply to the example of FIG. 3C as well.

Along the lines described in the foregoing for the examples of FIGS. 3A and 3B, in the example of FIG. 3C each bar serves to represent both the first and second precipitation characteristic of the weather data 124 pertaining to the sub-period of time represented by the respective bar in the timeline image displayed in the interactive time selection view 204 and the precipitation data records used as basis for deriving the bar characteristics may be identified in the same manner as described in the foregoing in context of the example of FIG. 3A. As a non-limiting illustrative example, the first precipitation characteristics may be indicative of spatial coverage of precipitation during the corresponding sub-period of time and the second precipitation characteristic may be indicative of precipitation intensity during the corresponding sub-period of time.

Again assuming that precipitation indications are provided as an array of numerical values that each serve to indicate precipitation intensity in a respective spatial position of the map image shown in the map view 202 (as outlined in the foregoing), the height of a bar in the timeline and the color intensity for the bar may be computed as a function of array element values in the identified precipitation data records for example using the following approach:

The height of a bar in the timeline may be derived on basis of a height reference computed as an average of respective precipitation values computed for the identified precipitation data records. As an example in this regard, a precipitation value for a given precipitation data record may be computed as the number of non-zero-valued array elements in the given precipitation data record, the height reference thereby indicating average spatial coverage of precipitation during the corresponding sub-period of time. In a variation of such computation of the height reference, the computation may consider array elements that have a value exceeding a predefined threshold (that has a value greater than zero).

The color intensity for a bar in the timeline may be derived on basis of a color intensity reference computed as an average of respective precipitation values computed for the identified precipitation data records. As an example in this regard, the precipitation value for a given precipitation data record may be computed as an average of non-zero-valued array elements in the given precipitation data record, the color intensity reference thereby indicating average precipitation intensity across locations where precipitation has been observed during the corresponding sub-period of time. In another example in this regard, the precipitation value for a given precipitation data record may be computed as a sum of array elements in the given precipitation data record, the color intensity reference thereby indicating average accumulated precipitation over the geographical area represented by the weather map image during the corresponding sub-period of time.

While the example described in the foregoing makes use of respective average precipitation values computed over the precipitation data records pertaining to a given sub-period of time in deriving the corresponding bar height and color intensity, in other examples one or both of the bar height and the color intensity may be derived on basis of a maximum of respective precipitation values within the precipitation data records pertaining to the given sub-period of time. As an example in this regard, the height of a bar in the timeline and the color intensity for the bar may be computed as a function of array element values in the identified precipitation data records for example using the following approach:

The height of a bar in the timeline may be derived on basis of a height reference computed as a maximum of respective precipitation values computed for the identified precipitation data records. As an example in this regard, a precipitation value for a given precipitation data record may be computed as the number of non-zero-valued array elements in the given precipitation data record, the height reference thereby indicating the largest observed spatial coverage of precipitation during the corresponding sub-period of time. In a variation of such computation of the height reference, the computation may consider array elements that have a value exceeding a predefined threshold (that has a value greater than zero).

The color intensity for a bar in the timeline may be derived on basis of a color intensity reference computed as a maximum of respective precipitation values computed for the identified precipitation data records. As an example in this regard, the precipitation value for a given precipitation data record may be computed as an average of non-zero-valued array elements in the given precipitation data record, the color intensity reference thereby indicating maximum short-term average precipitation intensity across locations where precipitation has been observed during the corresponding sub-period of time. In another example in this regard, the precipitation value for a given precipitation data record may be computed as a sum of array elements in the given precipitation data record, the color intensity reference thereby indicating maximum short-term accumulated precipitation over the geographical area represented by the weather map image during the corresponding sub-period of time.

As a generalization of the examples provided in the foregoing, the height reference and/or the color intensity reference for a bar in the timeline may be derived using a predefined function of precipitation values computed for the precipitation data records identified for the sub-period of time represented by said bar. Non-limiting examples of such functions include an integral or a derivative of precipitation values across the identified precipitation data records Still referring to examples pertaining to the illustration of FIG. 3C, the height reference and the color intensity reference computed e.g. according to any of the examples outlined in the foregoing are translated, respectively, into the height of the bar and to the color intensity for the bar according to a respective predefined mapping rule or function. Conceptual examples in these regard are outlined in the following in context of examples of FIGS. 3A and 3B.

In a variation of the example pertaining to FIG. 3C described in the foregoing, the roles of the bar height and color intensity may be reversed, i.e. the first precipitation characteristics may be indicative of precipitation intensity during the corresponding sub-period of time and the second precipitation characteristic may be indicative of spatial coverage of precipitation during the corresponding sub-period of time. In such a variation, the height reference and the color intensity reference are computed as described in the foregoing, mutatis mutandis.

The example described with references to FIG. 3C may be varied in a number of ways within the framework of the GUI 200. In this regard, the exemplifying variations with respect to appearance of the symbols that constitute the timeline in the timeline image as well as with respect to the position and appearance of the interactive time selection view 204 in relation to the map view 202 described in the foregoing in context of the examples of FIGS. 3A and 3B apply to the examples of FIG. 3C as well.

Referring to examples of FIGS. 3A, 3B and 3C, in an example the precipitation values computed for respective precipitation data records in context of derivation of the bar height and/or derivation of the color intensity for a bar are computed on basis of the precipitation indications available in the respective precipitation records when constructing the timeline image. In another example, the precipitation values are provided as pre-computed values that are available in the metadata of the respective precipitation data record.

Figure 4A:
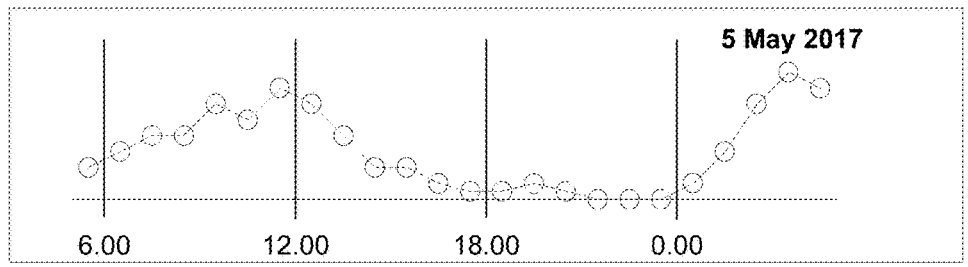
FIGS. 4A and 4B schematically illustrate a time selection image according to respective examples.
Figure 4B:
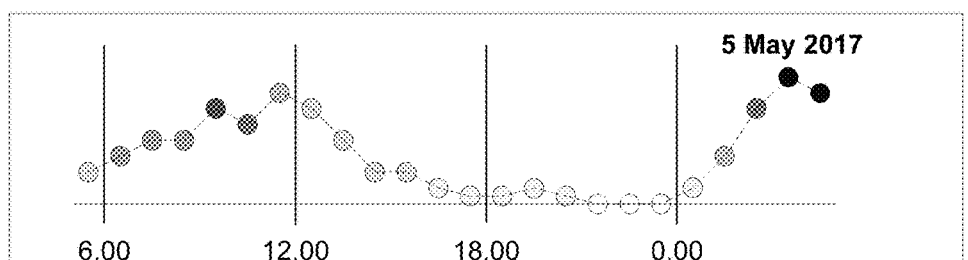

While the examples of FIGS. 3A to 3C make use of bars as an example of symbols representing the sub-periods of time in the timeline image (or in a time selection image in general), in other examples symbols of other desired type (such as circles, rectangles, stars, etc. or even symbols of arbitrary shape) may be used instead of bars such that the displacement of a symbol from a baseline (e.g. a horizontal or vertical reference line) serves as an indication of at least one precipitation characteristic for the sub-period of time represented by the respective symbol. In such a scenario, the displacement from the baseline for each bar may be derived e.g. by using one of the approaches described in the foregoing for deriving the bar heights, mutatis mutandis. As an example in this regard, FIG. 4A depicts a timeline image where the information conveyed by the example of FIG. 3A (and FIG. 3B) is arranged into a circles of equal size, displacement of a circle from a horizontal baseline being descriptive of at least one precipitation characteristic for the sub-period of time period represented by the respective circle. As another example in this regard, FIG. 4B depicts a timeline image where the information conveyed by the example of FIG. 3C is arranged into a circles of equal size, displacement of a circle from a horizontal baseline being descriptive of a first precipitation characteristic for the sub-period of time period represented by the respective circle and the color intensity of the circle being descriptive of a second precipitation characteristic for the sub-period of time period represented by the respective circle. In a yet another example, the example of FIG. 4B may be extended such that in addition to the displacement of a circle from the baseline being descriptive of the first precipitation characteristic and the color intensity of the circle being descriptive of the second precipitation characteristic, the circles may be provided in different sizes such that the size of the circle is descriptive of a third precipitation characteristic for the sub-period of time period represented by the circle.

Figure 5:
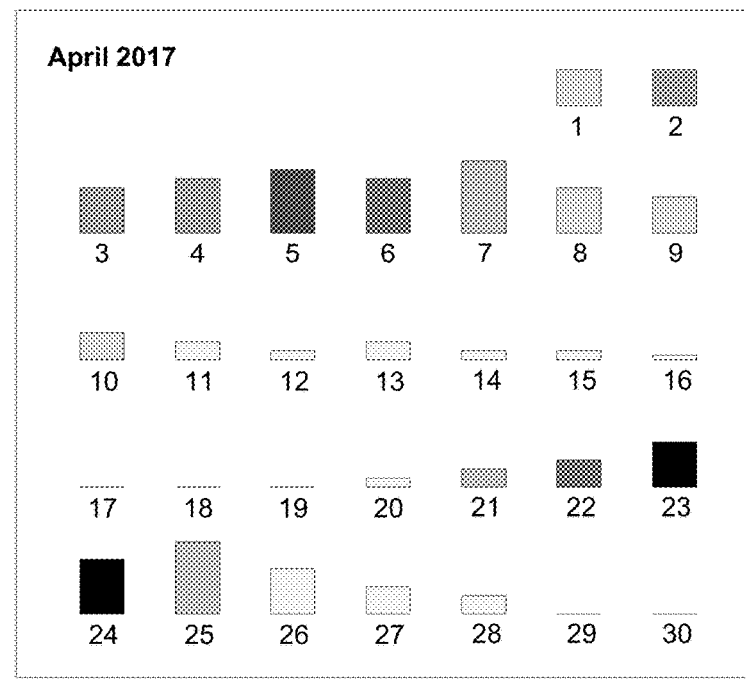
FIG. 5 illustrates a time selection image according to an example.

As pointed out in the foregoing, the timeline image described via a number of examples with references to FIGS. 3A, 3B, 3C, 4A and 4B serves as an illustrative and non-limiting example of a time selection image. In another example, the time selection image may be provided as a time grid image where the symbols representing the sub-periods of time between the current starting and ending times are arranged into two or more rows of symbols. As a conceptual example in this regard, FIG. 5 illustrates bars of the type described in the timeline image of FIG. 3C arranged into rows of at most seven symbols. The example of FIG. 5 depicts 30 bars that, as an illustrative and non-limiting example, represent sub-periods of time that map to days of April 2017. However, usage of a time grid image is not limited to providing such a 'calendar view' but each symbol may represent any suitable sub-period of time (different from one day) and any suitable number of symbols per row, number of rows and positioning of the symbols within a row may applied instead.

The timeline image derived e.g. according to one of the examples pertaining to any of FIGS. 3A, 3B, 3C and 3D outlined above enables efficient operation of the weather data visualization system 100 by providing illustrative and intuitive indication of the at least one characteristic of the weather data 124 over sub-periods of time currently displayed via the interactive time selection view 204. Such visualization of at least one precipitation characteristic as a function of time facilitates user access to weather data 124 exhibiting precipitation characteristic(s) of interest without unnecessary browsing through a high number of precipitation data records e.g. in a sequential manner in order to locate the information the user is looking for, thereby enabling computationally efficient operation of the weather data visualization system 100.

Along the lines described in the foregoing, the user may access the weather data 124 for a time instant of interest via the interactive time selection view 204. In this regard, the user may operate the user input means 130 (e.g. a mouse or a pointing device of other type) to indicate a position of interest in the interactive time selection view 204, which maps into a time instant of interest in accordance with the current time period depicted by the time selection image currently displayed in the interactive time selection view 204. In response to receiving an indication of the time instant of interest, the weather map image composition entity 112 operates to compose the weather map image on basis of the precipitation data record representing the time instant of interest or on basis of a precipitation data representing a time instant that is closest to the time instant of interest.

Since the current time period depicted in the time selection image currently displayed in the interactive time selection view 204 may not include the time period the user is interested in, the time selection image currently displayed in the interactive time selection view 204 may not include a type of precipitation characteristic(s) the user is interested in, or the user may otherwise wish to browse through different time periods, the GUI 200 provides a mechanism that enables the user to modify the time period displayed in the interactive time selection view 204 via the user input means 130. In this regard, suitable user interface (UI) mechanisms known in the art may be employed to enable receiving, via the GUI 200, respective user selections that result in modification of the time selection image displayed in the interactive time selection view 204 of the GUI 200.

As an example in this regard, the GUI 200 may enable the user to shift the current time period represented by the arrangement of symbols (e.g. the timeline) such that the temporal length (i.e. duration) of the time period represented by the time selection image displayed in the interactive time selection view 204 remains unchanged while the current starting time and the current ending time are changed accordingly. A UI mechanism that enables shifting the current time period may include, for example, the user operating a mouse or applying a swiping gesture on a touchscreen on a portion of the display means 140 displaying the interactive time selection view 204 to 'drag' the current time period to cover an earlier or a later time period, providing in the GUI 200 user-operable buttons that cause shifting the current time period to, respectively, cover an earlier or a later time period when operated by the user (e.g. by a mouse or by tapping a touchscreen), providing the GUI with a UI mechanism that enables the user typing or otherwise inputting the new current starting time or ending time to redefine the current time period, etc.

As another example, the GUI 200 may enable the user to zoom in or out in time such that one or both of the current starting time and the current ending time that define the end points of the current time period represented by the timeline image are changed, thereby resulting in a time selection image that represents a shorter time period (due to zooming in) or a time selection image that represents a longer time period (due to zooming out). In response to one or both of the current starting time and ending time having changed due to the user shifting the current time period or zooming in or out in time, the timeline processing entity 114 recreates the time selection image accordingly and provides it for rendering in the interactive time selection view 204 of the GUI 200 via the display means 140.

A UI mechanism that enables zooming in and out in time may include, for example, the user operating a scroll wheel of a mouse or applying a pinching gesture on a touchscreen on a portion of the display means 140 displaying the interactive time selection view 204 to zoom in or out in time, providing in the GUI 200 user-operable buttons that cause, respectively, zooming in or out in time when operated by the user (e.g. by a mouse or by tapping a touchscreen), providing the GUI with a UI mechanism that enables the user typing or otherwise inputting the new current starting time and ending time to redefine the current time period, etc.

In an example, the number of symbols that represent the sub-periods of time in the time selection image is fixed to a predefined value. In other words, there may be a fixed predefined number of symbols (and hence a fixed predefined number of sub-periods of time) in the time selection image displayed in the interactive time selection view 204, while the duration of the sub-period of time corresponding to a single symbol in the arrangement of symbols changes with the duration of the current time period represented by the time selection image. In a variation of this example, the GUI 200 may provide a mechanism that enables the user to select the number of symbols (and hence the number of sub-periods of time) to be included in the time selection image via the user input means 130. In another example, the duration of sub-periods is fixed to predefined value (or to a value received via the GUI 200 as user input) such that the number of sub-periods (and hence the number of symbols) in the time selection image is defined in dependence of the current time period represented by the time selection image.

In a further example, the GUI 200 may provide a mechanism that enables the user to re-arrange the symbols in the time selection image into a predefined order in view of one aspect of appearance of the symbols in the arrangement of symbols depicted in the time selection image, thereby re-arranging the symbols according the respective precipitation characteristic values. In this regard, the predefined order may be e.g. a descending order or an ascending order. As concrete examples in this regard, with the timeline image of FIG. 3A (or 3C) the predefined order may be a descending or ascending order of bar height, while with the timeline image of FIG. 3B (or 3C) the predefined order may be a descending or ascending order of color intensity. Such re-arranging of the symbols may facilitate user accessing the precipitation data records that exhibiting precipitation characteristic(s) of interest in an efficient manner.

The interactive time selection view 204 may further display one or more symbols that serve to indicate a time instant of respective one or more annotations that, in turn, represent significant precipitation events. An indication of annotation for a certain time instant may be stored in metadata of the precipitation data record representing the certain time instant. An annotation may serve to denote a weather event such a storm, excessive lightning, excessive rainfall, etc. An indication of an annotation may inserted in the metadata of a desired precipitation data record manually by a user and/or it may be introduced by an automated procedure that derives an indication of an annotation based on precipitation indications of a precipitation data record and inserts an indication thereof in the metadata of the respective precipitation data record.

In this regard, when composing the time selection image, the timeline processing entity 114 may check the precipitation data records considered in composition of the time selection image to identify precipitation data records that include an indication of an annotation: in case one or more precipitation data records including an annotation are encountered, the time selection image may be provided with an annotation symbol indicating presence of the respective annotation in spatial position(s) of the time selection image that map into the time instant(s) represented by the precipitation data record(s) that were identified to include a respective indication of an annotation.

In another example, an annotation may serve to indicate that a certain symbol appearing in the time selection image 'hides' a feature that is not fully reflected in the appearance of the certain symbol. As an example in this regard, the size of a given symbol (e.g. height or width of a bar) and/or the color intensity (or e.g. the color or pattern) for a given symbol may be derived on basis of respective averages of the precipitation characteristics across the weather data records identified for the sub-period of time represented by the given symbol, whereas one or more of the identified precipitation data records indicate precipitation characteristics that significantly (e.g. by more than a predefined threshold amount) exceeds the respective average value. In this regard, an automated procedure may operate to identify such a scenario and cause providing the time selection image with an annotation symbol that indicates presence of the 'hidden' feature in a spatial position of the time selection image that represents the temporal position of the identified 'hidden' feature.

In the foregoing, the structure and operation of the weather data visualization system 100 has been described via a number of examples that predominantly refer to usage of precipitation data (that indicates spatial coverage and intensity of precipitation) as the weather data 124. However, the description readily generalizes to usage of the weather data visualization system 100 in visualization of weather data of different type. Non-limiting examples in this regard include wind-related data where the time series of data records of the weather data 124 serve to store information that is descriptive of wind speed and wind direction within a geographical area of interest and road condition related data that where the time series of data records of the weather data 124 serve to store information that is descriptive of a simulated or observed icing factor and an indication of the timing of the most recent road maintenance operation within a geographical area of interest.

FIG. 6 depicts a flowchart 300 that represents steps of an exemplifying method for implementing the operations or functions described in the foregoing for the weather data visualization system 100. The method of FIG. 6 serves to visualize the weather data 124 stored as the time series of precipitation data records via the GUI 200 that is accessible via a display of a computer. The method 300 commences from visualizing the weather data 124 via the GUI 200 that provides the map view 202 for displaying the weather map image for a user-selectable time instant and the interactive time selection view 204 for displaying the time selection image for user selection of said time instant, as indicated in block 302.

The method comprises composing the time selection image that depicts an arrangement of symbols that jointly represent the current time period, each symbol of the arrangement representing a respective sub-period of time within the current time period and each symbol having an appearance that is descriptive of at least one precipitation characteristic in one or more precipitation data records that include weather data for the respective sub-period of time, as indicated in block 304. In an example, as described via a number of examples in the foregoing, one or more aspects of appearance of a symbol in the arrangement of symbols in the time selection image are descriptive of respective one or more predefined precipitation characteristics indicated by one or more precipitation data records that include weather data for the respective sub-period of time.

The method further comprises receiving, via the GUI 200, an indication of user-selected time instant from the current time period displayed in the interactive time-selection view 204, as indicated in block 306. The method further comprises composing the weather map image by overlaying the weather image on the map image, wherein the weather image is derived on basis of a precipitation data record that includes weather data for the user-selected time instant, as indicated in block 308.

The method represented by the flowchart 300 may be modified or complemented in a plurality of ways, for example as described in the foregoing in context of the weather data visualization system 100.

Figure 7:
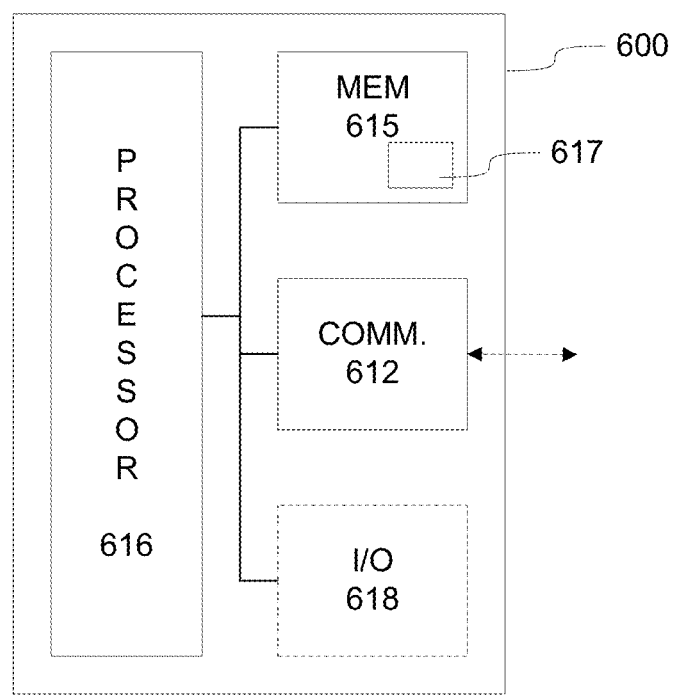
FIG. 7 illustrates a block diagram of some components and/or entities of an apparatus for implementing a weather data visualization system according to an example.

FIG. 7 illustrates a block diagram of some components of an exemplifying apparatus 600. The apparatus 600 may comprise further components, elements or portions that are not depicted in FIG. 7. The apparatus 600 may be employed in implementing the weather data visualization system 100 described in the foregoing. The apparatus 600 comprises a processor 616 and a memory 615 for storing data and computer program code 617. The processor 616 may be arranged to provide the weather data processing entity 114 and the memory 615 may be arranged to provide the data storage means 120 or at least part thereof. The memory 615 and a portion of the computer program code 617 stored therein may be further arranged to, with the processor 616, to implement the function(s) described in the foregoing in context of the weather data visualization system 100. The apparatus 600 may be referred to as a computer or a computing apparatus.

The apparatus 600 may comprise a communication portion 612 for communication with other devices. The communication portion 612 comprises at least one communication apparatus that enables wired or wireless communication with other apparatuses. A communication apparatus of the communication portion 612 may also be referred to as a respective communication means.

The apparatus 600 may further comprise user I/O (input/output) components 618 that may be arranged, possibly together with the processor 616 and a portion of the computer program code 617, to provide the GUI 200 that enables receiving input from a user of the apparatus 600 and/or providing output to the user of the apparatus 600 to control at least some aspects of operation of the weather data visualization system 100 implemented by the apparatus 600. The user I/O components 618 may serve to provide the user input means 130 and the display means 140. In this regard, the user I/O components may comprise hardware components such as a display, a touchscreen, a touchpad, a mouse, a keyboard, and/or an arrangement of one or more keys or buttons, etc. The user I/O components 618 may be also referred to as peripherals. The processor 616 may be arranged to control operation of the apparatus 600 e.g. in accordance with a portion of the computer program code 617 and possibly further in accordance with the user input received via the user I/O components 618 and/or in accordance with information received via the communication portion 612.

Although the processor 616 is depicted as a single component, it may be implemented as one or more separate processing components. Similarly, although the memory 615 is depicted as a single component, it may be implemented as one or more separate components, some or all of which may be integrated/removable and/or may provide permanent/semi-permanent/dynamic/cached storage.

The computer program code 617 stored in the memory 615, may comprise computer-executable instructions that control one or more aspects of operation of the apparatus 600 when loaded into the processor 616. As an example, the computer-executable instructions may be provided as one or more sequences of one or more instructions. The processor 616 is able to load and execute the computer program code 617 by reading the one or more sequences of one or more instructions included therein from the memory 615. The one or more sequences of one or more instructions may be configured to, when executed by the processor 616, cause the apparatus 600 to carry out operations, procedures and/or functions described in the foregoing in context of the weather data visualization system 100.

Hence, the apparatus 600 may comprise at least one processor 616 and at least one memory 615 including the computer program code 617 for one or more programs, the at least one memory 615 and the computer program code 617 configured to, with the at least one processor 616, cause the apparatus 600 to perform operations, procedures and/or functions described in the foregoing in context of the weather data visualization system 100.

The computer programs stored in the memory 615 may be provided e.g. as a respective computer program product comprising at least one computer-readable non-transitory medium having the computer program code 617 stored thereon, the computer program code, when executed by the apparatus 600, causes the apparatus 600 at least to perform operations, procedures and/or functions described in the foregoing in context of the weather data visualization system 100. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

What is claimed is:

1. A method for visualizing weather data stored as a time series of precipitation data records via a graphical user interface, GUI, accessible via a display of a computer, wherein the GUI provides a map view for displaying a weather map image for a user-selectable time instant and an interactive time selection view for displaying a time selection image for selection of said user-selectable time instant, the method comprising:
    composing the time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time;
    receiving, via the GUI, an indication of user-selected time instant from the current time period displayed in the interactive time-selection view;
    composing the weather map image by overlaying a weather image on a map image, wherein the weather image is derived on basis of a precipitation data record that includes weather data for the user-selected time instant.

2. A method according to claim 1, wherein:
    image portions of the weather image that spatially correspond to map image locations for which no precipitation is depicted are transparent, and
    image portions of the weather image that spatially correspond to map image locations for which precipitation is depicted are shown as non-transparent with a color of the non-transparent portion of the weather image serving as an indication of precipitation intensity in the respective map image location.

3. A method according to claim 1, wherein one or more aspects of appearance of a symbol in the series of symbols in the timeline image are descriptive of respective one or more predefined precipitation characteristics indicated by one or more precipitation data records that include weather data for the respective sub-period of time.

4. A method according to claim 3, wherein said one or more aspects include one of the following:
    a size of the symbol,
    one of a color, a color intensity and a pattern applied for depicting the symbol,
    a size of the symbol and one of a color, a color intensity and a pattern applied for depicting the symbol.

5. A method according to claim 3, wherein said one or more characteristic include one or more of the following:
    a spatial coverage of precipitation in relation to a geographical area represented by the map image,
    a measure of precipitation intensity.

6. A method according to claim 5, wherein at least one of the following applies:
    said spatial coverage of precipitation comprises one of the following: an average spatial coverage within the respective sub-period of time, a maximum spatial coverage within the respective sub-period of time, and
    said measure of precipitation intensity comprises one of the following: an average precipitation intensity within the respective sub-period of time, a maximum precipitation intensity within the respective sub-period of time, an accumulated precipitation within the respective sub-period of time.

7. A method according to claim 3, wherein precipitation data in a precipitation data record comprises a plurality of precipitation indications that serve to indicate precipitation intensity for a respective plurality of predefined locations within the geographical area represented by the map image and wherein composing the time selection image comprises, for each symbol depicted therein,
    identifying precipitation data records that include weather data for the sub-period of time represented by the respective symbol;
    computing, for each of said one or more aspects, a respective reference value as a respective function of precipitation indications in the identified weather data records; and
    deriving, for each of said one or more aspects, respective aspect of the appearance of the symbol according to a respective predefined mapping rule in dependence of the respective reference value.

8. A method according to claim 7, wherein said function of precipitation indications is a predefined function that is not dependent on duration of the sub-period of time represented by the respective symbol.

9. A method according to claim 7, wherein said function of precipitation indications is one of a plurality of predefined functions that is selected in dependence of duration of the sub-period of time represented by the respective symbol.

10. A method according to claim 7, wherein said respective function of precipitation indications comprises one of the following:
    an average or a maximum of respective first precipitation values over the identified precipitation data records, wherein the first precipitation value for a given precipitation data record is provided as a number of precipitation indications in a weather data record having value meeting a predefined criterion, an average, a maximum or a sum of respective second precipitation values over the identified precipitation data records, wherein the second precipitation value for a given precipitation data record is provided as an average or as a sum of precipitation indications in a weather data record having value meeting a predefined criterion.

11. A method according to claim 1, comprising:
receiving, via the GUI, one or both of the following: an indication of a user-selected starting time for the current time period and an indication of a user-selected ending time for the current time period;
modifying the current time period in accordance with the respective received indications of at least one of the user-selected starting time and the user-selected ending time; and
composing the time selection image in accordance with the modified current time period.

12. A method according to claim 1, wherein the time selection image depicts a predefined number of symbols.

13. A method according to claim 1, wherein a symbol of the time selection image represents a sub-period of predefined duration.

14. A method according to claim 1, wherein both the number of symbols included in time selection image and the duration of a sub-period of time a symbol serves to represent is dependent on the duration of the current time period.

15. A method according to claim 1, wherein said arrangement of symbols comprises a time series of symbols that constitute a timeline.

16. An apparatus for visualizing weather data stored as a time series of precipitation data records, the apparatus comprising at least one processor and at least one memory including computer program code, which when executed by the at least one processor causes the apparatus to visualize the weather data via a graphical user interface, GUI, that provides a map view for displaying a weather map image for a user-selectable time instant and an interactive time selection view for displaying a time selection image for selection of said user-selectable time instant, wherein the computer program code, when executed by the at least one processor, further causes the apparatus to:

compose the time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time;
receive, via the GUI, an indication of user-selected time instant from the current time period displayed in the interactive time selection view; and
compose the weather map image by overlaying a weather image on a map image, wherein the weather image is derived on basis of a precipitation data record that includes weather data for the user-selected time instant.

17. A computer program product for visualizing weather data stored as a time series of precipitation data records, the computer program product comprising computer readable program code tangibly embodied on a non-transitory computer readable medium, the program code configured to, when run on a computing apparatus, cause the computing apparatus to visualize the weather data via a graphical user interface, GUI, that provides a map view for displaying a weather map image for a user-selectable time instant and an interactive time selection view for displaying a time selection image for selection of said user-selectable time instant, said visualization of the weather data comprising:
composing the time selection image that depicts an arrangement of symbols that jointly represent a current time period, each symbol of the arrangement representing a respective sub-period of time within the current time period and each symbol having an appearance that is descriptive of at least one precipitation characteristic in one or more precipitation data records that include weather data for the respective sub-period of time;
receiving, via the GUI, an indication of user-selected time instant from the current time period displayed in the interactive time-selection view;
composing the weather map image by overlaying a weather image on a map image, wherein the weather image is derived on basis of a precipitation data record that includes weather data for the user-selected time instant.

* * * * *